(12) United States Patent
Kaneko et al.

(10) Patent No.: US 7,586,578 B2
(45) Date of Patent: Sep. 8, 2009

(54) DISPLAY DEVICE

(75) Inventors: Toshiki Kaneko, Chiba (JP); Kazuhiko Yanagawa, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 452 days.

(21) Appl. No.: 11/081,701

(22) Filed: Mar. 17, 2005

(65) Prior Publication Data
US 2005/0218817 A1 Oct. 6, 2005

(30) Foreign Application Priority Data
Mar. 31, 2004 (JP) ............................... 2004-102643

(51) Int. Cl.
*G02F 1/1345* (2006.01)
(52) U.S. Cl. ................... 349/152; 349/139; 349/149
(58) Field of Classification Search ................ 349/149, 349/152, 151, 139
See application file for complete search history.

(56) References Cited

U.S. PATENT DOCUMENTS

| | | | |
|---|---|---|---|
| 6,366,331 B1 * | 4/2002 | Sakamoto et al. ............. 349/43 |
| 6,396,558 B1 * | 5/2002 | Kim et al. ..................... 349/152 |
| 6,888,606 B2 * | 5/2005 | Hinata et al. ................. 349/149 |
| RE39,452 E * | 1/2007 | Fujikawa et al. ............... 257/72 |
| 2001/0022640 A1 * | 9/2001 | Nakahara ..................... 349/123 |
| 2002/0071086 A1 * | 6/2002 | Kim et al. ..................... 349/152 |
| 2007/0146602 A1 * | 6/2007 | Yuh et al. ..................... 349/139 |

FOREIGN PATENT DOCUMENTS

JP  5-119340  5/1993

* cited by examiner

*Primary Examiner*—David Nelms
*Assistant Examiner*—Nathanael R Briggs
(74) *Attorney, Agent, or Firm*—Antonelli, Terry, Stout & Kraus, LLP.

(57) ABSTRACT

A display device includes a terminal portion on a substrate thereof. The terminal portion includes a first transparent conductive layer, an insulation film which has an opening exposing a portion of the first transparent conductive layer, and a second transparent conductive layer which is formed in a state such that the second transparent conductive layer covers the first transparent conductive layer which is exposed from the insulation film and the opening of the insulation film. The first transparent conductive layer is connected with a signal line which extends to the terminal portion from below the signal line.

8 Claims, 11 Drawing Sheets

DISPLAY DEVICE

BACKGROUND OF THE INVENTION

The present invention relates to a display device, for example, a display device having improved terminal portions.

A display device typically has a large number of pixels formed as an array on a display part thereof, and signals are supplied on respective lenses to these pixels so as to independently control the display produced by these pixels. Accordingly, the number of terminals of the respective signal lines which extend from the display part becomes extremely large, while the area of each terminal is extremely small.

In general, the terminal portions of the respective signal lines may be formed, in a state in which the signal lines are covered with an insulation film, by forming holes in the insulation film so as to expose portions of the surfaces of the signal lines. However, when moisture or the like from the outside air or the like comes into control with the terminal portion, the moisture or the like forms an electrolyte and generates an electrolytic which produces an ionic exchange with other neighboring terminal portions, whereby it is impossible to prevent corrosion of the terminal portions.

Accordingly, there is a known structure in which the exposed portions of signal lines are covered with a light transmitting conductive film, such as ITO (Indium Tin Oxide), for example. Since such a light transmitting conductive film is an oxide, the film represents a chemically stable material.

SUMMARY OF THE INVENTION

However, the inventors of the present invention have found that, in a method which connects a metal signal line and the ITO and forms a terminal portion using the ITO, the apparent wiring resistance is increased. This increase in the wiring resistance cannot be explained simply by the ordinary fact that the ITO, which has a higher specific resistance than that of the metal signal line, is interposed in the course of the signal path.

As a result of extensive studies carried out by the inventors of the present invention, it has been found that this increase in the apparent wiring resistance is attributed to the manufacturing process used in forming the metal signal line and the ITO. That is, when the metal signal line is formed preliminarily and, thereafter, the ITO is formed so as to establish the connection of both elements, it has been found that an insulating oxide layer is formed on a metal surface at the time of forming the ITO film. It has been also found that the apparent wiring resistance is increased due to this formation of the insulating oxide layer.

The present invention has been made in view of such circumstances, and it is one object of the present invention to provide a display device which can realize a reduction of a substantial wiring resistance by reducing the connection resistance between a metal signal line and the ITO.

A summary of typical aspects of the invention disclosed in this specification is as follows.

(1) A display device according to the present invention, for example, has a terminal portion on a substrate thereof, wherein the terminal portion includes a first transparent conductive layer, an insulation film which has an opening exposing a portion of the first transparent conductive layer, and a second transparent conductive layer which is formed in a state such that the second transparent conductive layer covers the first transparent conductive layer which is exposed from the insulation film and the opening of the insulation film, wherein the first transparent conductive layer is connected with a signal line which extends to a terminal portion from below the signal line.

(2) The display device according to the present invention, for example, on the premise of the constitution (1), has the signal line formed on an upper surface of the first transparent conductive layer in a state such that the signal line is brought into contact with the first transparent conductive layer, but does not extend to the opening of the insulation film.

(3) The display device according to the present invention, for example, on the premise of the constitution (1), the signal line formed on an upper surface of the first transparent conductive layer in a state such that the signal line is brought into contact with the first transparent conductive layer and, at the same time, extends to a portion of the opening of the insulation film.

(4) A display device according to the present invention, for example, has a terminal portion on a substrate thereof, wherein the terminal portion includes a first transparent conductive layer, a plurality of scattered conductive layers which are formed on an upper surface of the first transparent conductive layer, an insulation film which has an opening exposing a portion of the first transparent conductive layer together with the conductive layers, and a second transparent conductive layer which is formed in a state such that the second transparent conductive layer covers the first transparent conductive layer and the conductive layers which are exposed from the insulation film and the opening of the insulation film, wherein the first transparent conductive layer is connected with a signal line which extends to the terminal portion.

(5) The display device according to the present invention, for example, on the premise of the constitution (4), has the signal line formed on an upper surface of the first transparent conductive layer in a state such that the signal line is brought into contact with the first transparent conductive layer and, at the same time, extends to a position immediately in front of the opening of the insulation film, and the respective conductive layers are formed of the same material as the signal line.

(6) The display device according to the present invention, for example, on the premise of the constitution (4), has the signal line formed on an upper surface of the first transparent conductive layer in a state such that the signal line is brought into contact with the first transparent conductive layer and, at the same time, extends to a portion of the opening of the insulation film, and the respective conductive layers are formed of the same material as the signal line.

(7) A display device according to the present invention, for example, has a semiconductor device mounted on a substrate thereof and includes a terminal portion which is connected to the substrate by way of a bump electrode of the semiconductor device and an anisotropic conductive film, wherein the terminal portion includes a first transparent conductive layer, an insulation film which has an opening exposing a portion of the first transparent conductive layer, and a second transparent conductive layer which is formed in a state such that the second transparent conductive layer covers the first transparent conductive layer which is exposed from the insulation film and the opening of the insulation film, wherein the first transparent conductive layer is connected with a signal line which extends to the terminal portion from below the signal line.

(8) A display device according to the present invention, for example, has a semiconductor device mounted on a substrate thereof and includes a terminal portion which is connected to the substrate by way of a bump electrode of the semiconductor device and an anisotropic conductive film, wherein the terminal portion includes a first transparent conductive layer, a plurality of scattered conductive layers which are formed on an upper surface of the first transparent conductive layer, an insulation film which has an opening exposing a portion of the first transparent conductive layer together with the conductive layers, and a second transparent conductive layer which is formed in a state such that the second transparent conductive layer covers the first transparent conductive layer and the conductive layers which are exposed from the insulation film and the opening of the insulation film, wherein the first transparent conductive layer is connected with a signal line which extends to the terminal portion.

The present invention is not limited to the above-mentioned constitutions and various modifications can be made without departing from the technical concept of the present invention.

In a terminal portion having such constitutions, the first transparent conductive layer is formed below the metal signal line. Accordingly, at the time of forming the first transparent conductive layer, it is possible to structurally prevent the formation of an oxide layer on a surface of the metal signal line, and, hence, a reduction of the connection resistance between the signal line and the first transparent conductive layer can re realized, whereby a reduction of the actual wiring resistance can be realized.

Further, when the first transparent conductive layer is formed as the lower layer, at the time of forming the terminal portion using the first transparent conductive layer, there arises a drawback in that the a terminal area is restricted to the inside of the opening region of the insulation film formed above the first transparent conductive layer. Accordingly, to avoid this drawback, the terminal is formed by forming the second transparent conductive layer above the insulation layer and by electrically connecting the first transparent conductive layer and the second transparent conductive layer. Due to such a constitution, the terminal can be formed in a given shape due to the second transparent conductive layer, and, hence, it is possible to reduce the connection resistance between the terminal and the external circuit. Here, since both of the first transparent conductive layer and the second transparent conductive layer are transparent conductive bodies made of oxide, the possibility of the formation of the insulating oxide layer on an interface, which may occur at the time of connecting a metal signal line and the transparent conductive body, can be fundamentally excluded, whereby it is possible to achieve a degree of freedom in selecting the shape of the terminal without worrying about the connection resistance.

In this case, the present invention provides a structure in which a signal passes from the second transparent conductive layer to the first transparent conductive layer and, thereafter, passes upwardly to the signal line. Due to such a structure, a reduction of the connection resistance at the connection portion can be achieved, and, hence, a substantial reduction of the wiring resistance can be realized.

BRIEF DESCRIPTION OF THE SEVERAL VIEWS OF THE DRAWING

FIG. 1A to FIG. 1C are diagrams showing one embodiment of the constitution of a terminal portion of a display device according to the present invention, wherein FIG. 1A is a plan view, FIG. 1B is a cross-sectional view, and FIG. 1C is another cross-sectional view;

FIG. 5A to FIG. 5C are diagrams showing another embodiment of a terminal portion of a display device according to the present invention, wherein FIG. 5A is a plan view, FIG. 5B is a cross-sectional view, and FIG. 5C is another cross-sectional view;

FIG. 8A and FIG. 8B are diagrams showing one embodiment of respective terminal portions of a gate signal line of the display device according to the present invention, wherein FIG. 8A is a plan view and FIG. 8B is a cross-sectional view taken along a line b-b in FIG. 8A;

DETAILED DESCRIPTION OF THE INVENTION

Hereinafter, various embodiments of a display device according to the present invention will be explained in conjunction with the drawings.

Figure 2A:
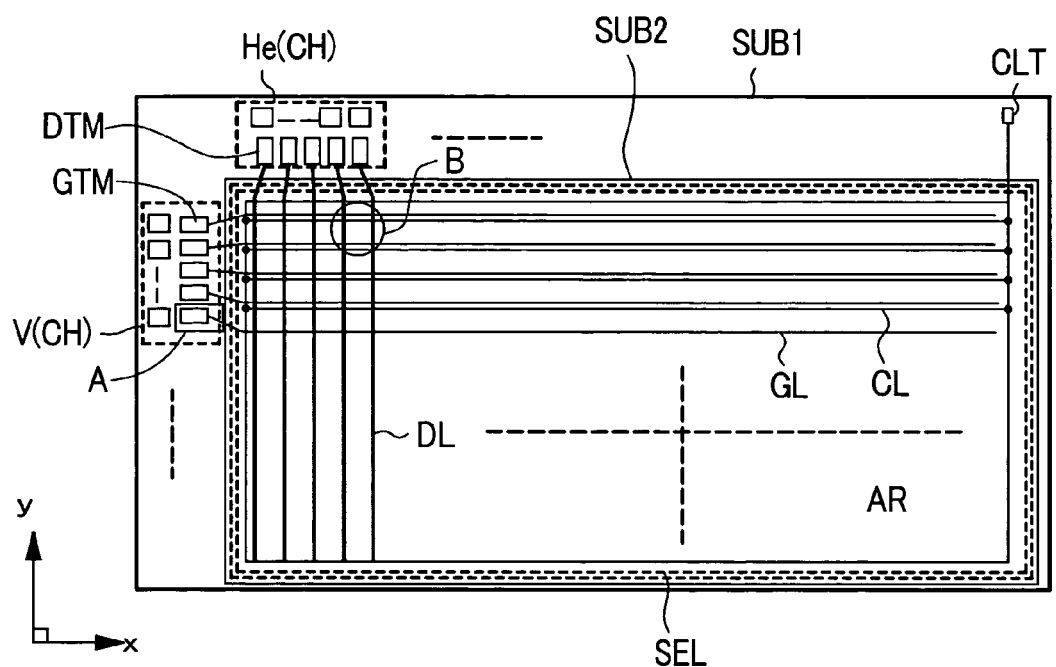
FIG. 2A is an overall plan view showing one embodiment of the display device according to the present invention.

FIG. 2A is a diagrammatic plan view showing one embodiment of a display device, for example, a liquid crystal display device according to the present invention.

The liquid crystal display device includes a pair of transparent substrates SUB1, SUB2 which are arranged to face each other in an opposed manner with liquid crystal disposed therebetween, wherein the liquid crystal is sealed by a sealing material SEL, which also has a function of fixing transparent substrate SUB2 to the transparent substrate SUB1.

On a liquid-crystal-side surface of the transparent substrate SUB1, which is surrounded by the sealing material SEL, gate signal lines GL extend in the x direction and are arranged in parallel in the y direction and drain signal lines DL extend in the y direction, and are arranged in parallel in the x direction.

Regions which are surrounded by the respective gate signal lines GL and the respective drain signal lines DL constitute pixel regions, and these respective pixel regions, formed in a matrix array, constitute a liquid crystal display part AR.

Further, in the respective pixel regions which are arranged in the x direction, a common counter voltage signal line CL runs in the inside of the respective pixel regions. The common counter voltage signal line CL constitutes a signal line for supplying a voltage which serves as a reference with respect to a video signal supplied to counter electrodes CT of the respective pixel regions, as will be described later.

In each pixel region, there are a thin film transistor TFT, which is operated in response to a scanning signal received from the one-side gate signal line GL, and a pixel electrode PX, to which a video signal from the one-side drain signal line DL is supplied through the thin film transistor TFT. An electric field is generated between the pixel electrode PX and the counter voltage CT, which is connected with the common counter voltage signal line CL, and the optical modulation ratio of the liquid crystal is controlled in accordance with the electric field.

Respective one ends of the gate signal lines GL extend beyond the sealing material SEL and these extending ends constitute a terminal GTM to which an output terminal of a scanning signal drive circuit V is connected. Further, to an input terminal of the scanning signal drive circuit V, a signal transmitted from a printed circuit board (not shown in the drawing), which is arranged outside the liquid crystal panel, is inputted.

The scanning signal drive circuit V is constituted of a plurality of semiconductor devices CH, wherein a plurality of neighboring gate signal lines GL are formed into a group and one semiconductor device CH is allocated to each group.

In the same manner, respective ends of the drain signal lines DL extend beyond the sealing material SEL, and these extending ends constitute a terminal DTM to which an output terminal of a video signal drive circuit He is connected. Further, to an input terminal of the video signal drive circuit He, a signal transmitted from a printed circuit board (not shown in the drawing), which is arranged outside the liquid crystal panel, is inputted.

The video signal drive circuit He is also constituted of a plurality of semiconductor devices CH, wherein a plurality of neighboring drain signal lines DL are formed into a group and one semiconductor device CH is allocated to each group.

The above-mentioned respective gate signal lines GL are sequentially selected one after another in response to the scanning signals from the scanning signal drive circuit V. Further, to the respective drain signal lines DL, video signals are supplied from the video signal drive circuit He in conformity with the selection timing of the gate signal lines GL.

Figure 3:
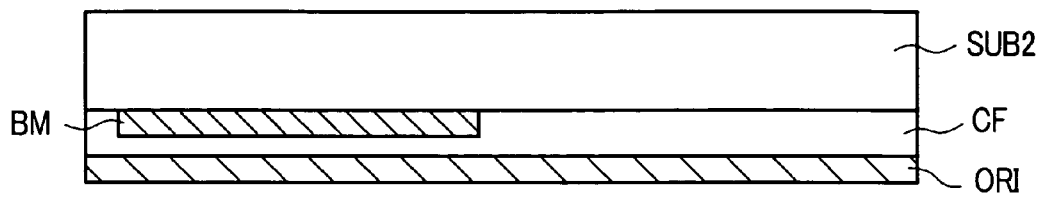
FIG. 3 is a cross-sectional view showing one embodiment of a pixel of the display device according to the present invention.
Figure 3:
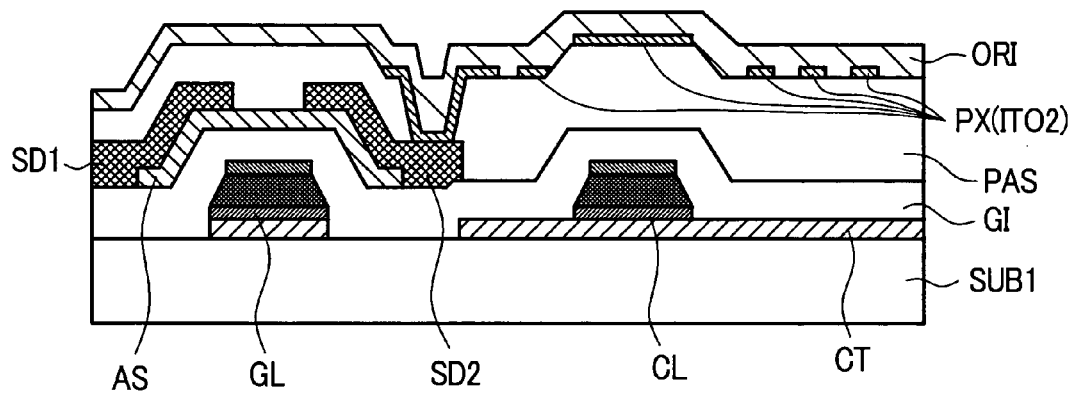

FIG. 3 is a cross-sectional view showing one embodiment of the constitution of a pixel. In FIG. 3, the region of the thin film transistor TFT is indicated on the left side, while the region which substantially functions as the pixel (the region where the optical transmissivity of the liquid crystal is observed with the naked eye) is indicated on a right side.

The above-mentioned counter electrode CT, which is formed on the latter region, is formed of a conductive layer which extends over the whole area in a matted manner, and, in the inside of the above-mentioned region via insulation films (an insulation film GI, a protective film PAS) formed on an upper surface of the counter electrode CT, a group of lines consisting of a plurality of conductive layers is formed, wherein the pixel electrodes PX extend in one direction and are arranged in parallel in the direction which crosses that one direction.

Both of the counter electrode CT and the pixel electrode PX are constituted as a light transmitting conductive layer made of a material such as, for example, ITO (Indium Tin Oxide), ITZO (Indium Tin Zinc Oxide), IZO (Indium Zinc Oxide), SnO (Tin Oxide), $In_2O_3$ (Indium Oxide), ZNO (Zinc Oxide), thus enhancing the so-called numerical aperture of the pixel.

That is, the counter electrode CT is formed on a liquid-crystal-side surface of the transparent substrate SUB1 and the common counter voltage signal line CL is formed on the counter electrodes CT such that the common counter voltage signal line CL crosses the counter electrodes CT. The common counter voltage signal line CL is formed simultaneously at the time of forming the gate signal line GL. The common counter voltage signal line CL and the gate signal line GL each have a three-layered structure and each is constituted of a sequentially stacked body consisting of Mo, Al, Mo, for example.

Here, below the gate signal line GL, a light transmitting conductive layer is formed simultaneously with the formation of the counter electrode CT. For example, such a constitution is realized by adopting a method of manufacture to be described later, for example.

On a surface on which the common counter voltage signal lines CL and the gate signal lines GL are formed, the insulation film GI is formed in a state such that the insulation film GI also covers the common counter voltage signal lines CL and the gate signal lines GL. With respect to this insulation film GI, at a portion thereof which overlaps with a portion of the gate signal line GL, a gate oxide film of the thin film transistor TFT is constituted, and a semiconductor layer AS, which is made of an amorphous material, for example, is formed on the portion.

The semiconductor layer AS forms a part of the thin film transistor TFT, wherein, as viewed from above, on an upper surface of the semiconductor layer AS, a drain electrode SD2 and a source electrode SD2 are formed so as to be which are spaced apart at a portion of the insulation film GI which overlaps with the gate signal line GL. The drain electrode SD1 is configured as an electrode which is connected with the drain signal line DL (not shown in the drawing). When a signal (the scanning signal) is supplied to the gate signal line GL, the thin film transistor TFT is turned on, and the signal (video signal) which is supplied to the drain signal line DL is supplied to the source electrode SD2. Here, as will become apparent from the explanation to be provided later, the source electrode SD2 is connected with the pixel electrode PX.

On a surface on which the thin film transistors TFT are formed, the protective film PAS is formed in a state such that the protective film PAS also covers the thin film transistors TFT. The protective film PAS is provided for obviating direct contact by the thin film transistors TFT with the liquid crystal and prevents deterioration of the properties of the thin film transistors TFT attributed to the liquid crystal. The protective film PAS may be formed of an inorganic material layer, an organic material layer or a stacked body formed of a combination of these material layers.

The pixel electrodes PX are formed on an upper surface of the protective film PAS, and the pixel electrodes PX are, as described above, formed as a group of a plurality of pixel electrodes PX, wherein the pixel electrodes PX have one end thereof connected with each other and have portions thereof connected with the source electrode SD2 via through holes formed in the protective film PAS below the pixel electrodes PX.

Here, on a surface on which the pixel electrodes PX are formed, an orientation film ORI is formed in a state such that the orientation film ORI also covers the pixel electrodes PX. The orientation film ORI determines the initial orientation of the molecules of the liquid crystal LQ which is brought into direct contact with the orientation film ORI.

On a liquid-crystal-LQ side of the transparent substrate SUB2, which is arranged to face the transparent substrate SUB1 in an opposed manner with the liquid crystal LQ disposed therebetween, black matrixes BM are formed at portions which correspond to the thin film transistors TFT. Further, the black matrixes BM are also formed wholly or partially on portions which define the pixel regions and other neighboring pixel regions.

Further, on a surface on which the black matrixes BM are formed, color filters CF are formed in a state such that the color filters CF also cover the black matrixes BM. Further, an orientation film ORI is formed over the black matrixes BM.

Figure 4A:
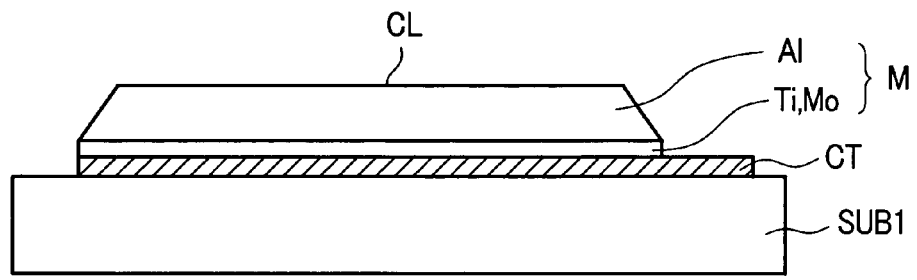
FIG. 4A and FIG. 4B are diagrams showing another embodiment of a signal line of the display device according to the present invention.
Figure 4B:
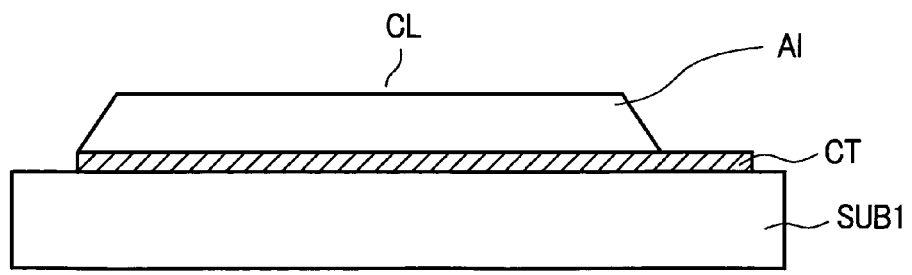

Here, as the material of the above-mentioned common counter voltage signal line CL (and the gate signal line GL), a Mo—Al—Mo stacked structure is adopted. However, as shown in FIG. 4A, the material of the common counter voltage signal line CL (and the gate signal line GL) may be formed of a sequentially stacked structure made of an alloy of Ti and Mo, and Al. Alternatively, as shown in FIG. 4B, it is needless to say that the material of the common counter voltage signal line CL (and the gate signal line GL) may be formed of only Al. FIG. 4A and FIG. 4B respectively show the common counter voltage signal line CL on the transparent substrate SUB1 and also show examples of the counter electrode CT formed below the common counter voltage signal line CL.

Figure 1A:
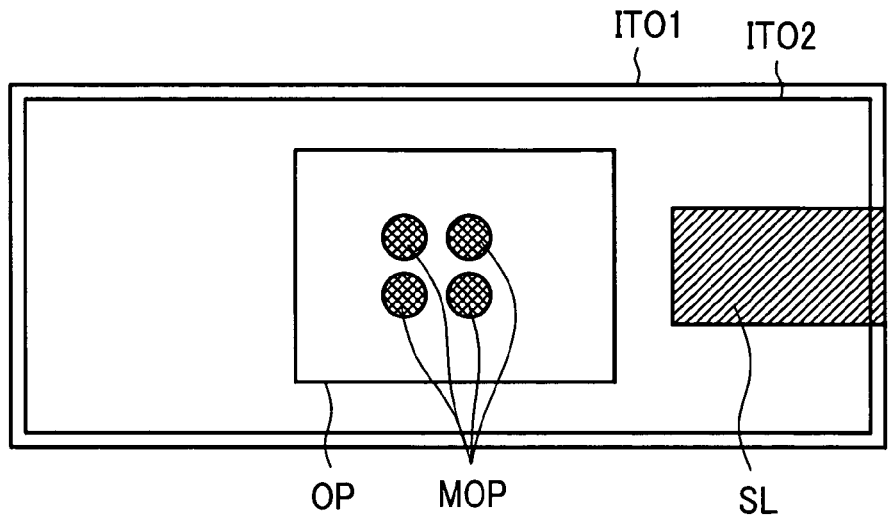
Figure 1B:
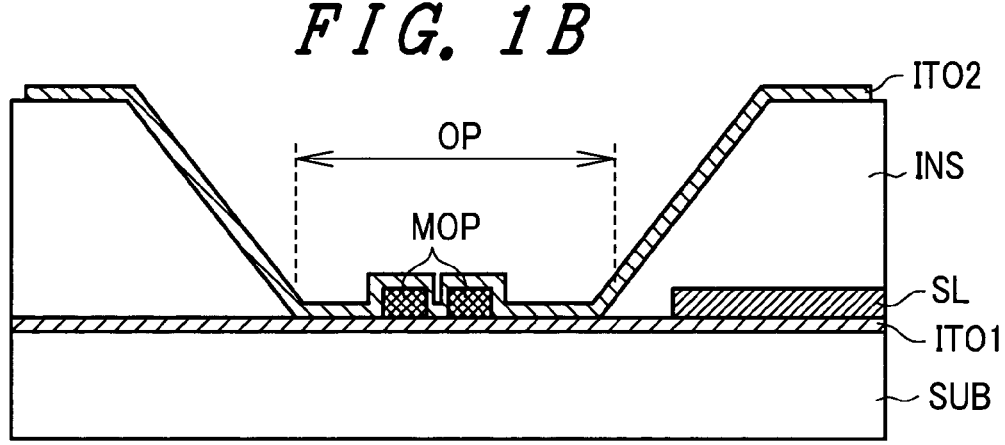
Figure 1C:
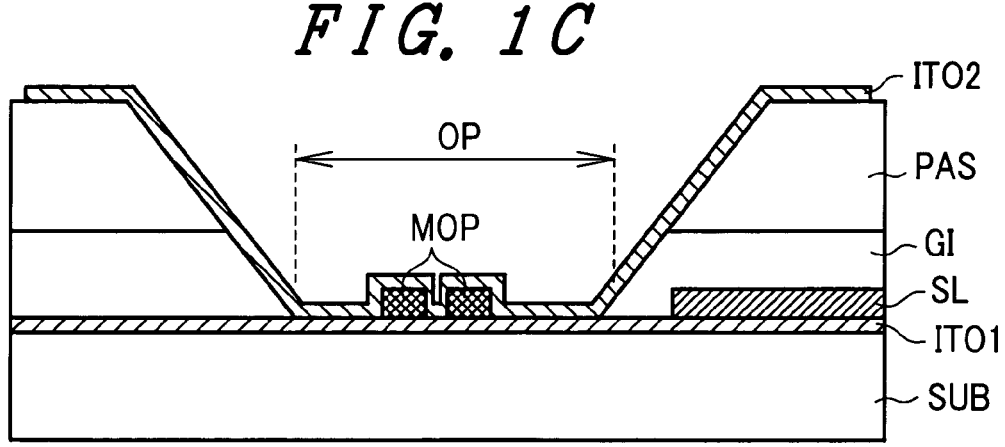
Figure 2B:
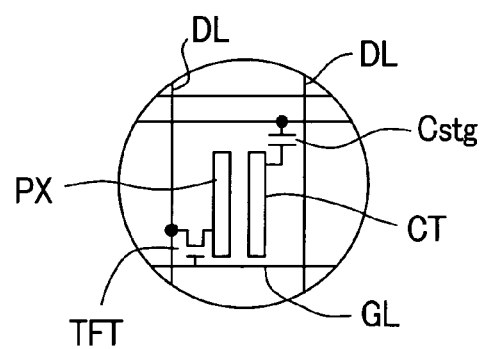
FIG. 2B is a schematic diagram of a pixel located in area B in FIG. 2A.

FIGS. 1A to 1C are diagrams showing one embodiment of a terminal which supplies a signal to the signal line SL (for example, the gate signal line GL or the drain signal line DL). These drawings correspond to a rectangular frame A shown in FIG. 2.

First of all, a first transparent conductive layer ITO1, which is made of ITO (Indium Tin Oxide), for example, is formed on a surface side of the transparent substrate SUB1. The first transparent conductive layer ITO1 is not always limited to the use of ITO and may be formed of an oxide conductive layer made of, for example, ITZO (Indium Tin Zinc Oxide), IZO (Indium Zinc Oxide), SnO (Tin Oxide), $In_2O_3$ (Indium Oxide), ZNO (Zinc Oxide). Further, it is sufficient that the conductive layer is formed at least on a terminal portion or on a periphery thereof.

Further, for example, the signal line SL, which extends from the liquid crystal display part AR, extends to the terminal portion side and is formed on the first transparent conductive layer ITO1 in a state such that the signal line SL extends at its end portion over the first transparent conductive layer ITO1. Here, the end portion of the signal line SL extends to a position immediately in front of the terminal portion and is formed there, and a plurality of island-like layers MOP, which are physically separated from the signal line SL, are formed in a center portion of the terminal portion in a state such that the island-like layers MOP are arranged close to each other. These island-like layers MOP are formed simultaneously with the formation of the signal line SL and are configured to be formed of the same material as the signal line SL.

The terminal portion is formed of an opening portion in an insulation film INS, which is formed by forming an opening in a portion thereof corresponding to a region which includes the above-mentioned island-like layers MOP and a periphery of the opening portion. Here, the insulation film INS is formed by extending the protective film PAS, which is formed on the liquid crystal display part AR, to a periphery of the terminal portion.

In the opening portion of the insulation film, a second transparent conductive layer ITO2, which is formed of ITO, is formed in a state such that the second transparent conductive layer ITO2 also covers the above-mentioned island-like layers MOP, which are exposed at the opening portion. The second transparent conductive layer ITO2 extends to the side wall faces of the opening portion and the surfaces of a periphery of the opening portion and are integrally formed with the opening portion.

Here, symbol OP in FIG. 1B shows an opening on a lower surface side of the insulation film INS and constitutes a substantial terminal region.

Further, although FIG. 1C shows substantially the same constitution as FIG. 1B, this drawing shows that the insulation film INS may be formed of a stacked body formed of the above-mentioned insulation film GI and the protective film PAS.

In the terminal portion having such a constitution, the signal line SL is not exposed to the opening of the insulation film INS at all; and, at the same time, there is absolutely no connection between the second transparent conductive layer ITO2, which is formed to cover the opening of the insulation film INS and the signal line SL.

In the terminal portion having such a constitution, the first transparent conductive layer ITO1 is formed below the metal signal line SL. Due to such a constitution, at the time of forming the first transparent conductive layer ITO1, it is possible, to structurally obviate the formation of an oxide layer on a surface of the metal signal line, and, hence, a reduction of the connection resistance between the signal line SL and the first transparent conductive layer ITO1 can be realized, whereby a substantial reduction of the wiring resistance can be realized.

Further, when the first transparent conductive layer ITO1 is formed as the lower layer, at the time of forming the terminal portion using the first transparent conductive layer ITO1, there arises a drawback in that the terminal area is restricted to the inside of the opening region of the insulation film formed on the first transparent conductive layer ITO1. Accordingly, by forming the second transparent conductive layer ITO2 on the insulation layer and by electrically connecting the first transparent conductive layer ITO1 and the second transparent conductive layer ITO2, the terminal is formed. Due to such a constitution, with the provision of the second transparent conductive layer ITO2, it is possible to form the terminal into a desired shape, and, hence, the connection resistance between the terminal and an external circuit can be reduced. Since both the first transparent conductive layer ITO1 and the second transparent conductive layer ITO2 are transparent conductive bodies made of oxide, the possibility of the formation of an insulating oxide layer on an interface, which may occur at the time of connecting metal to the transparent conductive body, can be fundamentally excluded, whereby it is possible to achieve a degree of freedom in selecting the shape of the terminal without worrying about the connection resistance.

In this case, this embodiment provides a structure in which a signal is transmitted from the second transparent conductive layer ITO2 to the first transparent conductive layer ITO1 and, thereafter, is transmitted upwardly to the signal line SL. Due to such a structure, a reduction of the connection resistance at the connection portion can be achieved, and, hence, a substantial reduction of the wiring resistance can be realized.

Figure 5A:
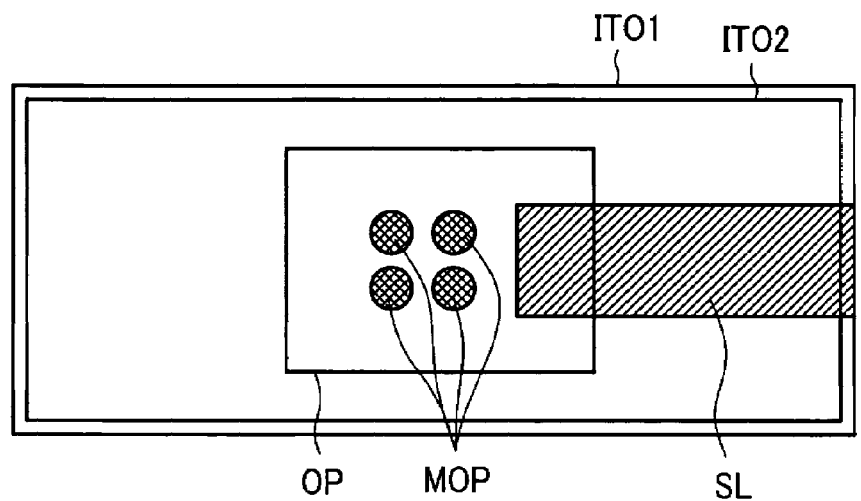
Figure 5B:
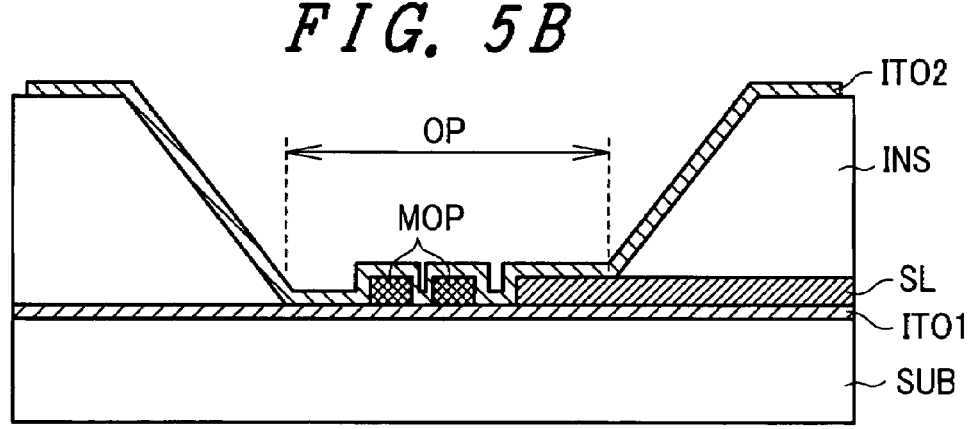
Figure 5C:
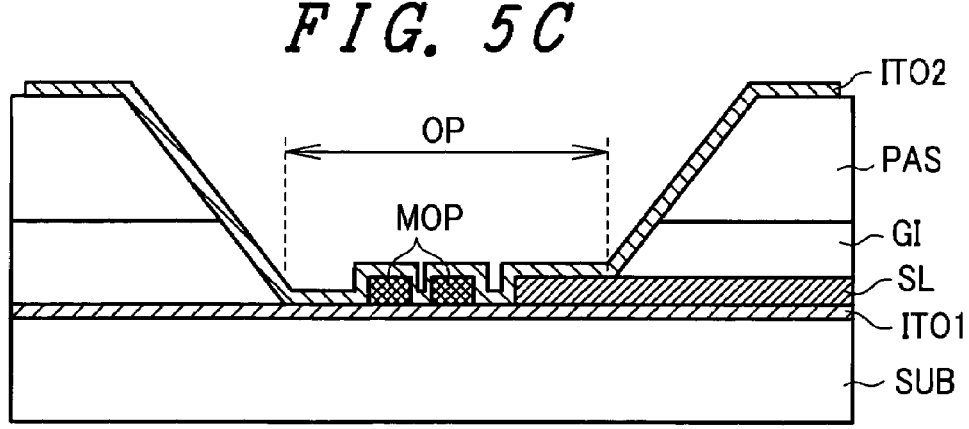

FIG. 5A to FIG. 5C are diagrams showing another embodiment of the terminal portion, and these views correspond generally to FIG. 1A to FIG. 1C. The constitution which makes this embodiment different from the embodiment shown in FIG. 1A to FIG. 1C lies in the fact that the signal line SL extends to the opening portion OP of the insulation film INS, but does not reach the center of the opening. In other words, the signal line SL is configured to be formed in a state such that the signal line SL extends to a portion of the opening portion OP of the insulation film INS. By adopting such a constitution, an upper layer of the signal line SL is connected with the second transparent conductive layer ITO2. That is, the signal line SL is connected with both the first transparent conductive layer ITO1 and the second transparent conductive layer ITO2, thus producing a redundancy in the connection.

Here, although the island-like layers MOP are formed in both FIG. 1 and FIG. 5, it is needless to say that these island-like layers MOP need not be formed depending on the case.

Figure 6:
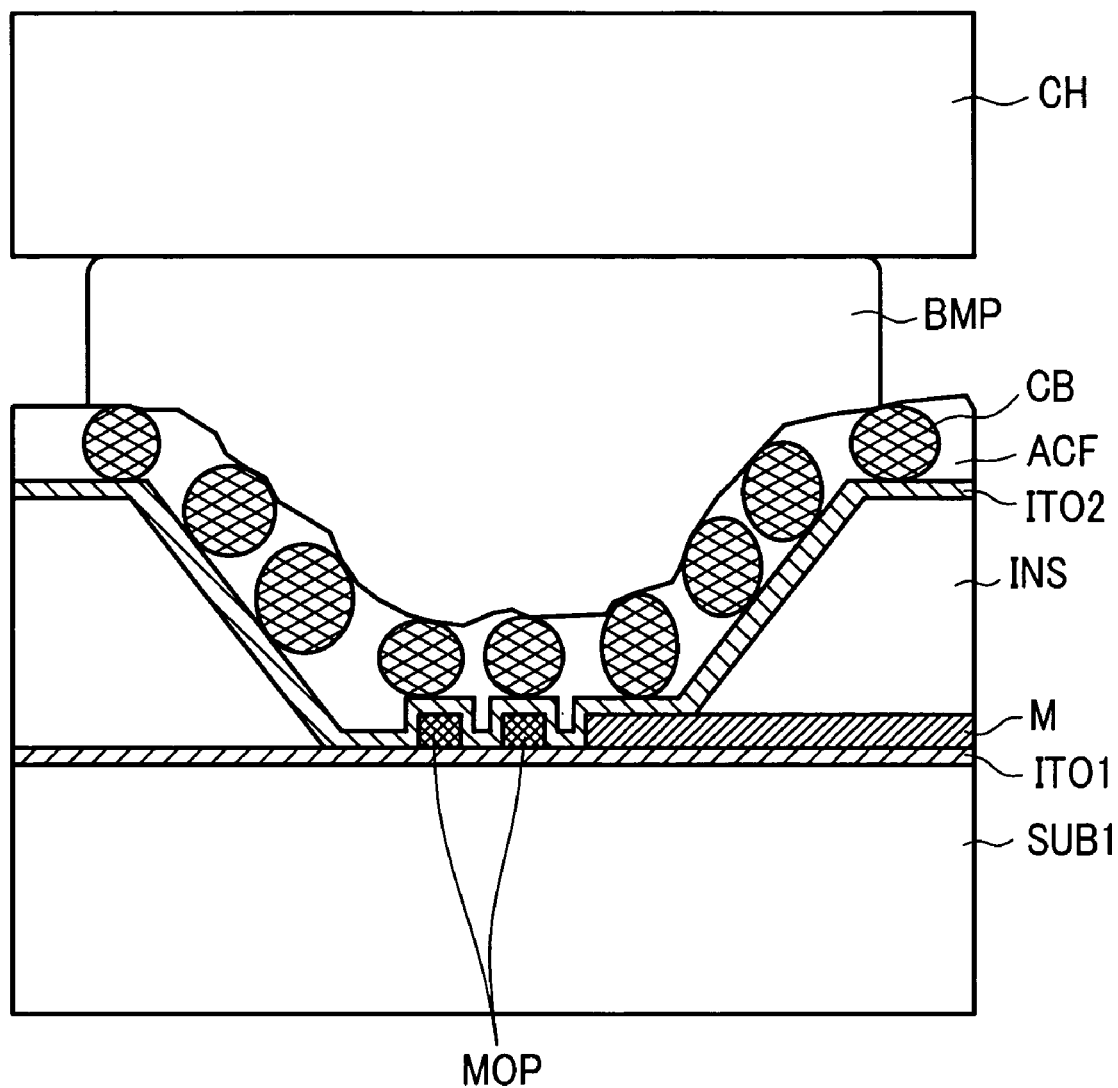
FIG. 6 is a diagram showing a connection state between the terminal portion of the display device according to the present invention and a bump electrode of a semiconductor device.

FIG. 6 shows a state in which a bump electrode BMP of the above-mentioned semiconductor device CH is brought into contact with a terminal portion having the above-mentioned constitution.

The electrical connection between the terminal portion and the bump electrode BMP is established via a so-called anisotropic conductive film ACF. The anisotropic conductive film ACF is formed by scattering a large number of conductive particles CB in a resin film, for example.

In this case, since a plurality of scattered conductive layers MOP are formed at the center of the terminal portion, due to the projection structure, the second transparent conductive layer ITO2 can ensure a large surface area, whereby the reliability of connection with the bump electrode BMP can be ensured. These advantageous effects can be realized by using parts other than the conductive layer as the conductive layers MOP. Further, the plurality of scattered conductive layers MOP also has a buffer function against a connection stress and can ensure a stable connection of the conductive particles CB with the second transparent conductive layer ITO2 in the inside of the anisotropic conductive film ACF. However, by forming the MOP into a conductive layer, it is possible to obtain the connection resistance reduction effect of the terminal portion.

In the pixel constitution shown in FIG. 3, the counter electrode CT and the counter voltage signal line CL, which is directly connected with and stacked on the counter electrode CT, are formed by a photolithography method using a mask one time, thus reducing the manufacturing man-hours.

Hereinafter, the manufacturing method will be explained in conjunction with FIG. 7A to FIG. 7G.

Figure 7A:
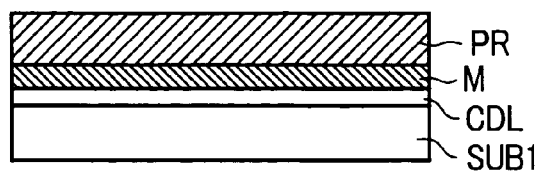
FIG. 7A to FIG. 7G are process flow diagrams showing one embodiment of a method of manufacture of a display device according to the present invention.

Step 1 (FIG. 7A)

On the surface (the liquid-crystal-side surface) of the transparent substrate SUB1, for example, the light transmitting conductive layer CDL and the metal layer M are sequentially formed, and, thereafter, a photoresist film PR is formed on the surface of the metal layer M.

Figure 7B:
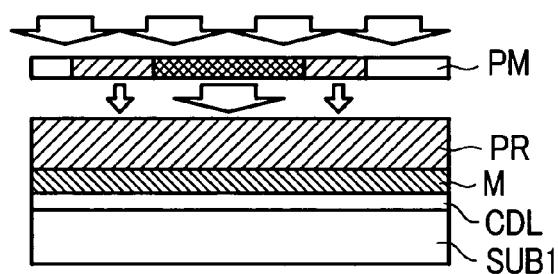

Step 2 (FIG. 7B)

The photoresist film PR is selectively exposed using a photo mask PM. Here, the photo mask PM is a photo mask for half exposure and includes a portion which completely blocks the exposure, a portion which performs a complete exposure and a portion which performs an intermediate exposure. For example, the photo mask PM is divided into a portion where the counter voltage signal line CL constitutes the portion where the exposure is complete, a portion where the counter electrode CT constitutes the portion where the intermediate exposure is performed, and an outer portion where the exposure is completely blocked.

The photoresist film PR which is exposed via the photo mask PM is exposed in response to the intensity of the exposure.

Figure 7C:
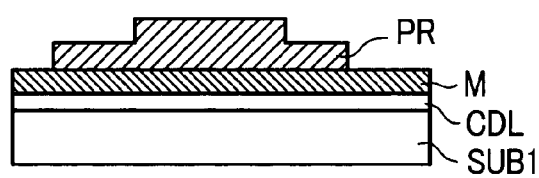

Step 3 (FIG. 7C)

By developing the photoresist film PM, the counter voltage signal line CL and the counter electrode CT are made to remain in the regions where the counter voltage signal line CL and the counter electrode CT are to be formed. Then, with respect to the remaining photoresist film PR, the portion corresponding to the region where the counter voltage signal line CL is formed is set such that the height of the portion is set higher than the height of portions corresponding to the regions where the counter electrode CT is formed.

Figure 7D:
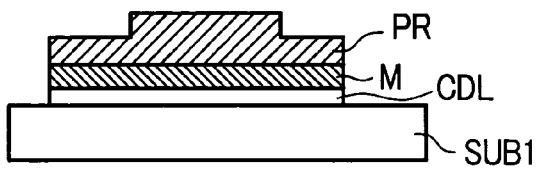

Step 4 (FIG. 7D)

Using the above-mentioned photo mask PM as a mask, the metal layer M, which is exposed from the mask, is selectively etched to expose a surface of the light transmitting conductive film CDL. The exposed light transmitting conductive film CDL is further etched.

Figure 7E:
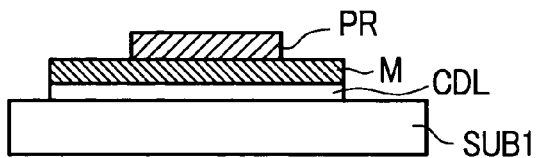

Step 5 (FIG. 7E)

So-called ashing of the photoresist film PM is performed thus uniformly reducing the thickness of the whole region of the photoresist film PM and the photoresist film PM, so that remains only on the portion which corresponds to the region where the counter voltage signal line CL is formed.

Here, as a step which comes before the above-mentioned ashing, so-called dehydration annealing (200° C. to 300° C.) treatment may be applied to reduce the etching rate of the light transmitting conductive film CDL.

Figure 7F:
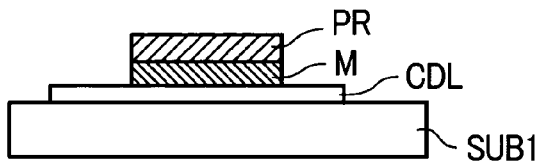

Step 6 (FIG. 7F)

Using the remaining photoresist film PM as a mask, the metal layer M, which is exposed from the mask, is selectively etched so as to expose the surface of the light transmitting conductive layer CDL.

Figure 7G:
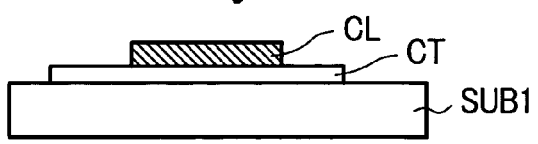

Step 7 (FIG. 7G)

By removing the photoresist film PM, the counter voltage signal line CL is formed of the metal layer M and the counter electrode CT is formed of the light transmitting conductive layer CDL.

Further, in this manufacturing method, since the gate signal line GL is simultaneously formed with the formation of the counter voltage signal line CL, it becomes apparent that a conductive layer formed of the same material as the counter electrode CT also remains below the gate signal line GL.

Figure 8A:
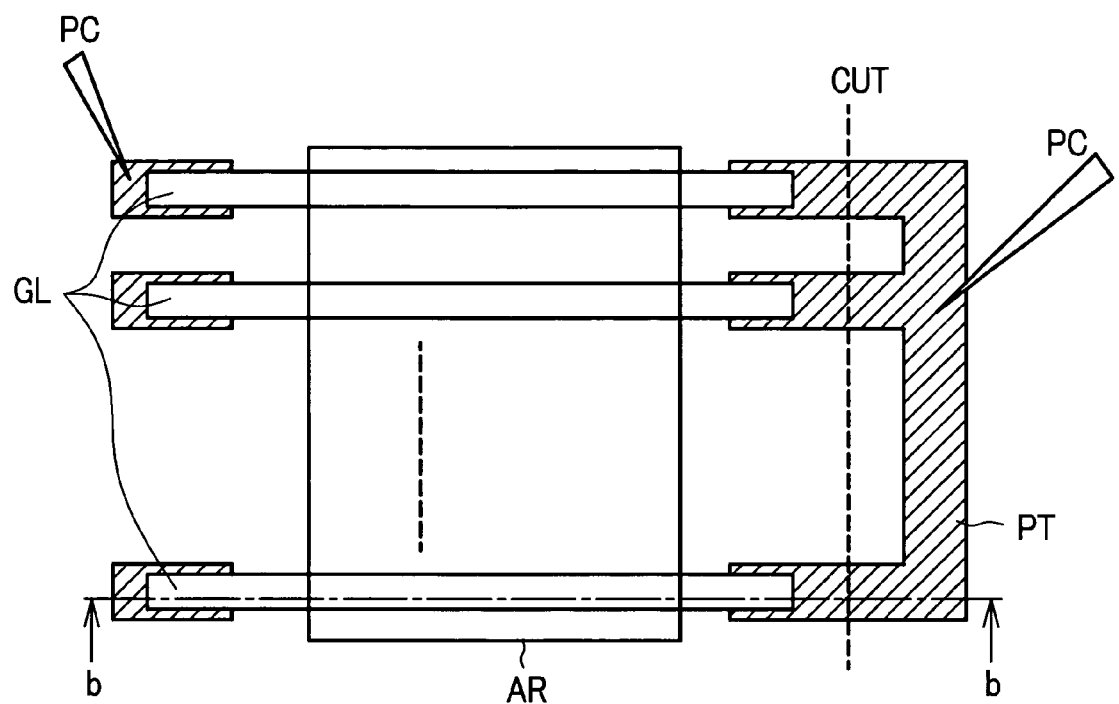
Figure 8B:
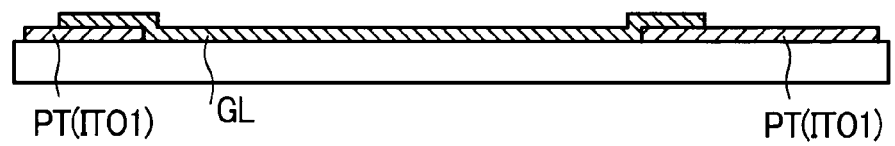

FIG. 8A is a view which shows another embodiment of the liquid crystal display device according to the present invention. FIG. 8A shows the constitution of both ends of each gate signal line GL, which is formed across the liquid crystal display part AR. Here, a cross-sectional view taken along a line b-b in FIG. 8A is shown in FIG. 8B.

One end (the left end in the drawing) of each gate signal line GL constitutes the terminal portion as mentioned above, and the light transmitting conductive layer is formed at the terminal portion, while the gate signal line GL is formed thereon.

In forming the gate signal line GL, at one end of the gate signal lines GL on a side opposite to the terminal portions, a light transmitting conductive layer PT is formed, which connects the one ends in common. This light transmitting conductive layer PT constitutes a circuit for efficiently performing an inspection to detect disconnection, short-circuiting and the like of the respective gate signal lines GL. After the inspection, the light transmitting conductive layer PT becomes unnecessary, and, hence, the respective gate signal lines GL are electrically separated from each other by cutting out extra portions of the transparent substrate SUB1 (cut along a line CUT in the drawing).

Here, the light transmitting conductive layer and the gate signal line GL are formed using a single photo mask step, as explained in the above-mentioned manufacturing method.

In performing the inspection of each gate signal line GL, as shown in the drawing, by allowing one probe to be in contact with the light transmitting conductive film of the terminal portion and another probe to be in contact with the light transmitting conductive film PT which connects respective gate signal lines GL in common, it is possible to prevent the probes PC from coming into contact with the surface of the gate signal line GL, which is constituted of a metal layer.

Assuming a case in which the contact surface of the probe PC is constituted of a metal layer, there exists the possibility that the metal layer is dissolved due to a potential difference generated by the surface resistance. With the above-mentioned constitution, this possibility can be obviated, and, hence, a reliable inspection can be realized.

The wiring of the above-mentioned counter voltage signal line CL, as one example, is constituted such that the light transmitting conductive film is formed below the counter voltage signal line CL.

When the wiring is constituted of Al or a stacked body which uses Al at least as an uppermost layer, there may be a case in which it is necessary to apply anodizing to a surface of the Al layer.

This is because, when an insulation film is formed to cover the Al layer, a so-called hillock may be generated on a surface of the Al layer during the formation process, and an electrical short-circuit may be generated with another conductive layer formed on the insulation film.

Figure 9:
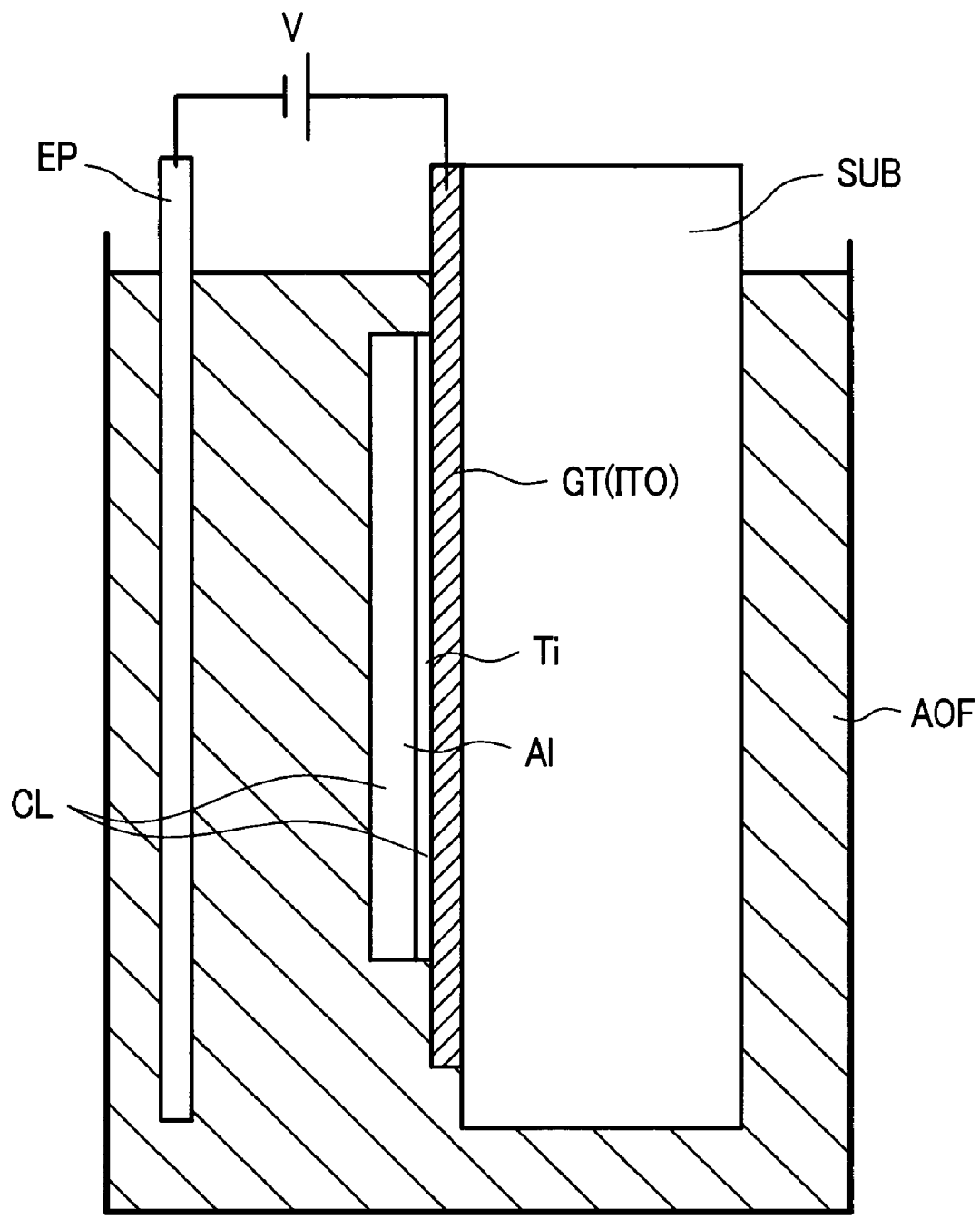
FIG. 9 is a diagram showing one embodiment of an anodizing method used in the manufacture of the display device according to the present invention.

For performing the anodizing, FIG. 9 is a view which shows a case which enables anodizing without using a mask, such as a photoresist film, particularly.

The transparent substrate SUB1, on which the patterned counter electrodes CT and counter voltage signal lines CL are sequentially stacked, is immersed in an electrolytic solvent AOF, and a voltage is applied between the transparent substrate SUB1 and an electrode EP, which is immersed in the electrolytic solvent AOF in the same manner so as to perform anodizing, thus forming aluminum oxide on a surface of the counter voltage signal line CL.

In this case, by applying the voltage on the transparent substrate SUB1 side to the counter electrode CT, the anodizing is not performed on the counter electrode CT, but and is performed only on the counter voltage signal line CL. This is because the counter electrode CT is constituted of a light transmitting conductive film and the light transmitting conductive film is not anodized.

The anodizing process based on such a concept is widely applicable as a general technique for anodizing.

Although the constitution of the pixel of the above-mentioned liquid crystal display device is as described above in conjunction with FIG. 3, it is needless to say that the pixel constitution is not always limited to such a constitution and the pixel may adopt other constitutions. For example, FIG. 10 corresponds generally to FIG. 3. The feature which makes the constitution shown in FIG. 10 different from the constitution shown in FIG. 3 lies in the fact that, with respect to the pixel electrode PX and the counter electrode CT which drive the liquid crystal, the pixel electrode PX is formed over the substantially the whole area in each pixel region on the transparent substrate SUB1 side, while the counter electrode CT is commonly formed over the respective pixel regions on the transparent substrate SUB2 side.

The pixel electrode PX and the counter electrode CT are each formed of a light transmitting conductive layer, and the optical modulation of the liquid crystal can be controlled in accordance with an electric field (an electric field in the orthogonal direction with respect to the surface of the transparent substrate SUB1) which is generated between the pixel electrode PX and the counter electrode CT.

It is needless to say that the present invention is applicable to a liquid crystal display device having such a pixel constitution. This is because the liquid crystal display device has the substantially the same task with respect to the respective terminal portions GTM, DTM which are formed on the gate signal line GL and the drain signal line DL.

Here, in such a pixel constitution, the counter voltage signal line CL shown in FIG. 3 is used as the capacitive signal line CL' in this embodiment. Further, in the same manner as shown in FIG. 3, below the capacitive signal line CL', a light transmitting conductive film (being used as the capacitive electrode CT in FIG. 10 and which does not always need to be formed over the whole are of the pixel region) having a width larger than the width of the capacitive signal line CL' is formed. This light transmitting conductive film is provided for increasing the capacitance of a capacitive element Cstg between the light transmitting conductive film and the pixel electrode PX, which is arranged on the light transmitting conductive film in an overlapped manner. In this case, since the conductive film is a light transmitting conductive film, it is possible to eliminate the possibility that the numerical aperture of the pixel is decreased.

In other words, by setting the width of the capacitive signal line CL' to a minimum value which does not influence the so-called writing, it is possible to increase the capacitance of the capacitive element Cstg by increasing the area of the light transmitting conductive film.

Figure 10:
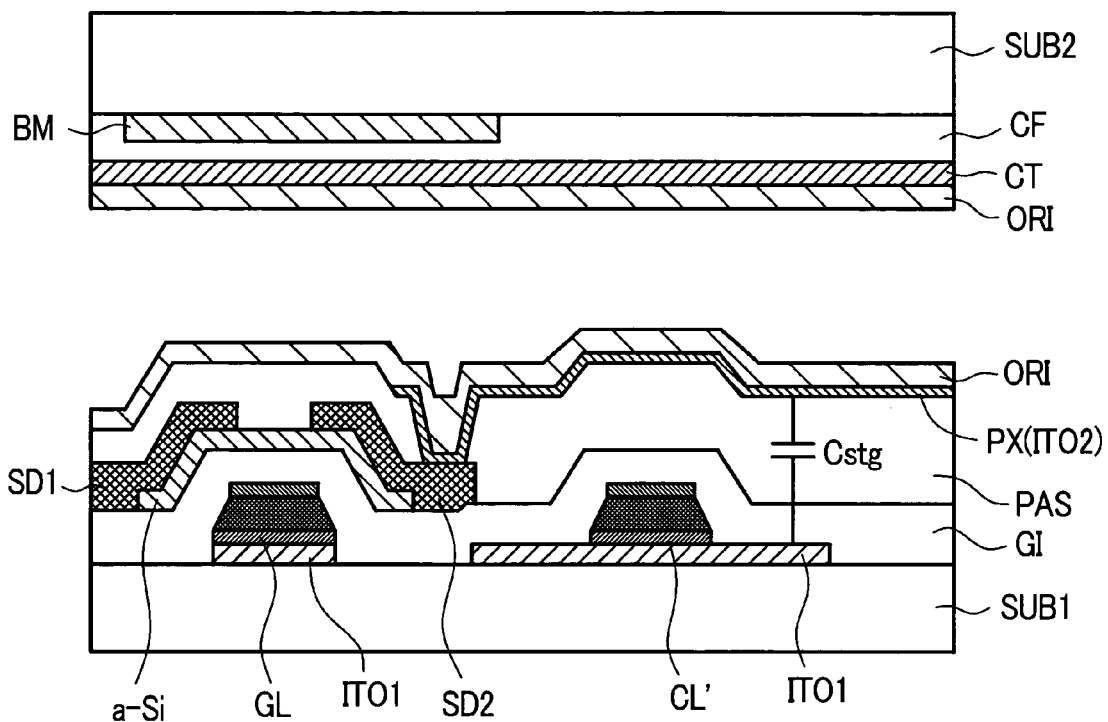
FIG. 10 is a cross-sectional view showing another embodiment of a pixel of the display device according to the present invention.
Figure 11:
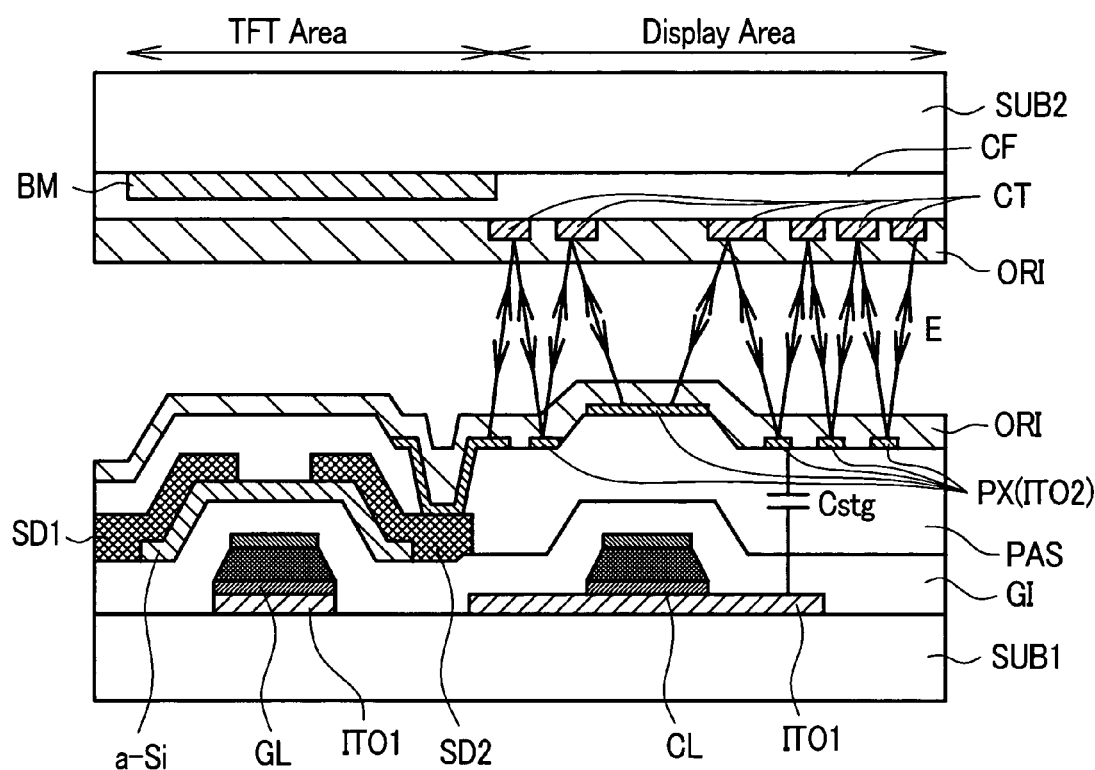
FIG. 11 is a cross-sectional view showing another embodiment of a pixel of the display device according to the present invention.

FIG. 11 corresponds generally to FIG. 10. The constitution shown in FIG. 11 differs from the constitution shown in FIG. 10 in that the pixel electrode PX and the counter electrode CT are not formed in a matted manner and are respectively constituted of a group formed of a plurality of electrodes. Electric fields are generated between respective electrodes of the pixel electrode PX and the electrodes of the counter electrode CT, which are arranged close to the respective electrodes constituting the pixel electrode PX. It is needless to say that the present invention is applicable to a liquid crystal display device having such a constitution.

Although an explanation has been given by taking a liquid crystal display device as an example in connection with the above-mentioned embodiments, the present invention also is applicable to, for example, an MIM (metal-insulator-metal) type FED display device and the like. Also, in such a MIM (metal-insulator-metal) type FED display device, the terminal structure has substantially the same function, and, at the same time, it is possible to make use of the above-mentioned layer structure formed of the counter voltage signal line CL and the counter electrode CT formed below the counter voltage signal line CL in the electrodes (signal lines) of the pixel.

Figure 12:
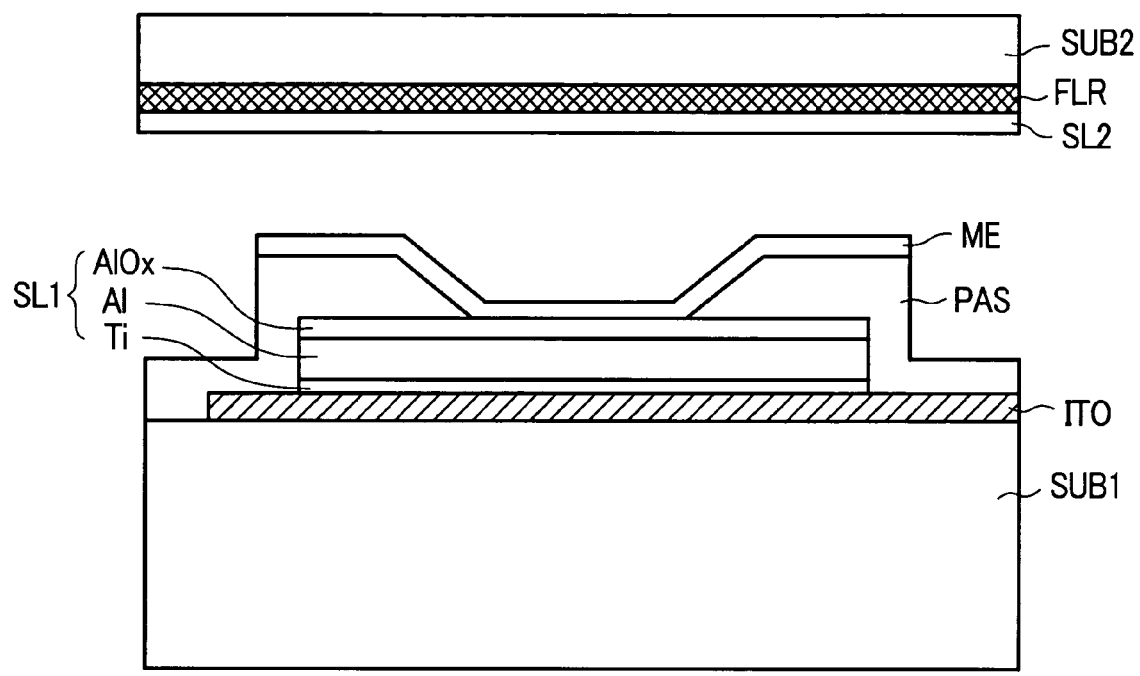
FIG. 12 is a cross-sectional view showing another embodiment of a pixel of the display device according to the present invention.

FIG. 12 is a cross-sectional view of one pixel in an MIM type display device. On a surface of the transparent substrate SUB1, a first signal line SL1 is formed, which extends from a front surface to a back surface of the drawing via the light transmitting conductive film.

The first signal line SL1 is constituted of a sequentially stacked body made of Ti and Al, and an aluminum oxide film is formed on a surface of the Al layer by anodizing. That is, in performing the anodizing, as shown in FIG. 9, the light transmitting conductive film is used as a conductive layer for supplying electricity, and, hence, the anodizing can be performed only on the surface of the signal line without requiring a mask.

On a surface on which the first signal line SL1 is formed, a protective film PAS is formed in a state such that the protective film PAS also covers the first signal line SL1. An opening is formed in the protective film PAS and a metal layer ME is formed in a state such that the metal layer ME covers the opening. Between the first signal line and the metal layer ME, a diode having the MIM structure is formed.

On an opposing surface of another transparent substrate SUB2, a phosphor layer FLR is formed and a second signal line SL2 is formed. The second signal line SL2 extends from the left side to the right side in the drawing and constitutes one pixel at a portion where the second signal line SL2 crosses the first signal line SL1, as seen in plan view.

In the display device having such a constitution, electrons from the metal layer ME are emitted to the second signal line SL2 via the diode from the first signal line SL1, and the electrons are allowed to pass through the second signal line SL2, thus allowing the phosphor FLR to emit light.

Although a light transmitting conductive material may be used as the material of the second signal line SL2, by using a metal layer, it is possible to impart the function of a reflection plate which reflects the light from the phosphor FLR to a viewer side (existing on the transparent substrate SUB2 side).

In the display device having such a constitution, at the terminal portion of the first signal line SL1, by adopting the constitution shown in FIG. 1 and simultaneously forming the light transmitting conductive film at the time of forming the light transmitting conductive film, it is possible to reduce the manufacturing man-hours.

Further, it is needless to say that the present invention is not limited to a liquid crystal display device and an MIM type FED display device, but is applicable as well to an organic EL display device.

The above-mentioned respective embodiments can be used in a single form or in combination. This is because the advantageous effects of the respective embodiments can be obtained individually, as well as synergistically.

What is claimed is:

1. A display device with a terminal portion on a substrate thereof, wherein the terminal portion comprises:
   a first transparent conductive layer;
   an insulation film which has an opening exposing a portion of the first transparent conductive layer, the opening enabling insertion of a terminal for external equipment;
   a second transparent conductive layer which is formed on at least a part of the portion of the first transparent conductive layer which is exposed from the insulation film at the opening of the insulation film;
      a plurality of conductive layers which are formed between the first transparent conductive layer and the second transparent conductive layer at the opening of the insulation film, the respective conductive layers being formed in a same layer; and
   a signal line which is formed between the insulation film and the first transparent conductive layer and is directly and electrically connected to the first transparent conductive layer, the first transparent conductive layer being formed between the signal line and the substrate.

2. A display device according to claim 1, wherein the signal line extends to a position immediately in front of the opening of the insulation film, and the respective conductive layers are formed of the same material as the signal line.

3. A display device according to claim 1, wherein the respective conductive layers are formed of the same material as the signal line.

4. A display device comprising:
   a semiconductor device mounted on a substrate;
   a terminal portion which is formed on the substrate, the terminal portion being connected to a bump electrode of the semiconductor device by way of an an isotropic conductive film,
   wherein the terminal portion has a signal line, a first transparent conductive layer, an insulation film which has an opening exposing a portion of the first transparent conductive layer, a second transparent conductive layer which is formed on the first transparent conductive layer at the opening of the insulation film, and a plurality of conductive layers which are formed between the first transparent conductive layer and the second transparent conductive layer at the opening in the insulation film, the respective conductive layers being formed in a same layer; and
   wherein the signal line is formed between the insulation film and the first transparent conductive layer and is directly and electrically connected to the first transparent conductive layer, the first transparent conductive layer being formed between the signal line and the substrate.

5. A display device according to claim 1, wherein the signal line is formed on the first transparent conductive layer.

6. A display device according to claim 1, wherein the signal line is formed so as to not extend to the opening of the insulation film.

7. A display device according to claim 1, wherein the signal line is formed so as to extend within the opening of the insulation film.

8. A display device according to claim 4, wherein the signal line is formed on the first transparent conductive layer.

* * * * *